United States Patent
Del Carpio Vega et al.

(10) Patent No.: US 11,902,018 B2
(45) Date of Patent: Feb. 13, 2024

(54) METHODS AND APPARATUS FOR PERFORMING LINK ADAPTATION PROCESSES IN A NETWORK

(71) Applicant: Telefonaktiebolaget LM Ericsson (publ), Stockholm (SE)

(72) Inventors: Luis Felipe Del Carpio Vega, Espoo (FI); Vicknesan Ayadurai, Sollentuna (SE); Divya Peddireddy, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 62 days.

(21) Appl. No.: 17/423,201

(22) PCT Filed: Jan. 29, 2019

(86) PCT No.: PCT/EP2019/052145
§ 371 (c)(1),
(2) Date: Jul. 15, 2021

(87) PCT Pub. No.: WO2020/156646
PCT Pub. Date: Aug. 6, 2020

(65) Prior Publication Data
US 2022/0069938 A1 Mar. 3, 2022

(51) Int. Cl.
*H04L 1/00* (2006.01)
*H04W 28/08* (2023.01)
*H04L 47/2441* (2022.01)

(52) U.S. Cl.
CPC .......... *H04L 1/0002* (2013.01); *H04L 1/0015* (2013.01); *H04L 47/2441* (2013.01); *H04W 28/0967* (2020.05)

(58) Field of Classification Search
None
See application file for complete search history.

(56) References Cited

U.S. PATENT DOCUMENTS

| | | |
|---|---|---|
| 2001/0040872 A1 | 11/2001 | Haglund |
| 2009/0147678 A1 | 6/2009 | Xhafa et al. |
| 2009/0219912 A1* | 9/2009 | Wengerter .......... H04L 47/6215 370/345 |

(Continued)

OTHER PUBLICATIONS

Farkas, J., "Focus on the Time-Sensitive Networking Task Group", Introduction to IEEE 802.1 (focus on TSN TG), May 15, 2017, pp. 1-50.

(Continued)

*Primary Examiner* — Jianye Wu
(74) *Attorney, Agent, or Firm* — COATS & BENNETT, PLLC

(57) ABSTRACT

Embodiments described herein relate to methods and apparatus for performing link adaptation processes in a network. A method in a transmitting node in a wireless local area network comprises obtaining a first traffic flow for transmitting to a receiving node, wherein the first traffic flow is associated with a first category based on a reliability requirement associated with the first traffic flow; selecting a first link adaptation process from a plurality of link adaptation processes based on the first category; and transmitting the first traffic flow to the receiving node based on the first link adaptation process.

18 Claims, 4 Drawing Sheets

(56) References Cited

U.S. PATENT DOCUMENTS

2020/0059817 A1* 2/2020 Baek ................. H04W 28/0273
2021/0243728 A1* 8/2021 Lee ....................... H04W 72/02

OTHER PUBLICATIONS

Xia, D., "Experimental Study on the Performance Rate Adaption Algorithm in IEEE 802.11g Networks", A thesis submitted to the Victoria University of Wellington in fulfilment of the requirements for the degree of Master of Engineering in Networking Engineering, Victoria University of Wellington, Jan. 1, 2013, pp. 1-137.

Shamy, K., et al., "Efficient Rate Adaption with QoS Support for Wireless Networks", 2008 IEEE Global Telecommunications Conference; IEEE Globecom 2008, Nov. 30, Dec. 4, 2008, pp. 1-6, New Orleans, Louisiana, XP031369844.

IEEE Standards Association, "Part 11: Wireless LAN Medium Access Control (MAC) and Physical Layer (PHY) Specifications", IEEE Computer Society, IEEE Std 802.11, Jan. 1, 2016, pp. 1-3534, New York, NY.

* cited by examiner

METHODS AND APPARATUS FOR PERFORMING LINK ADAPTATION PROCESSES IN A NETWORK

TECHNICAL FIELD

Embodiments described herein relate to method and apparatus for transmitting traffic flows from a transmitting device to a receiving device in a wireless local area network.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Traffic Sensitive Network (TSN) comprises an enhanced Ethernet technology which may provide guaranteed data transport with bounded low latency, low delay variation, and extremely low loss. TSN includes a set of components such as Synchronization, Reliability, Latency and Resource Management.

TSN technology is expected to be an enabler for industrial automation. TSN includes technologies like packet preemption on the Ethernet medium. For example, packet pre-emption works by stopping a frame transmission on the wire, replaces it with a priority transmission and then resumes the original stopped frame transmission.

A type of traffic present in most industrial applications is periodic traffic, for example, in process automation where sensor reports, and actuation commands are created periodically. When serving periodic traffic, the TSN system reduces the delay variation (jitter) of served packets. As the information carried on the traffic is used in almost a real-time fashion high reliability may be required (very low packet loss).

Wireless Local Area Network (WLAN), for example Wi-Fi, is a wireless communication system operating in Industrial Scientific and Medical (ISM) bands. There are several amendments of WLAN, for example, IEEE 802.11a/b/n/ac/ax. It is usually deployed as a star system where the Access Point (AP) is a device having a coordinator node (role) and the stations (STAs) are associated to APs. The AP maintains a Basic Service Set (BSS) to which the STAs are associated.

The WLAN system uses the Hybrid Coordination Function (HCF) which defines the EDCA (enhanced distributed channel access). The EDCA allows STAs to get access to the wireless medium (WM) via a listen-before talk procedure. This procedure is also known as Clear Channel Assessment (CCA).

In the IEEE 802.11ax, data from mobile stations (STAs) can be polled by the AP via trigger frames. In this case, the random access procedure is carried out at the AP, and STAs reply to the trigger frames if they have been scheduled explicitly. IEEE 802.11ax also allows multi-user uplink (UL) access via OFDMA where multiple STAs may reply to the same trigger frame on orthogonal frequency resources. There may also be trigger frames for common access which allows STAs to compete for orthogonal frequency resources via the OFDMA random access back-off (OBO). Trigger frames for explicit access and common access may be carried by the same physical packet.

A Minstrel rate adaptation algorithm is based on an acknowledgment feedback algorithm. It is used by many Linux wireless drivers such as Mad WIFI, Ath5k, and Ath9k. There are three main design concepts for the Minstrel adaptation algorithm: a retry chain mechanism, the rate decision process and the statistic calculations.

The Minstrel algorithm uses a process called a multi-rate retry chain which reacts to short term fluctuations in channel quality. It consists of four rate ($r_i$) count ($c_i$) pairs r0/c0, r1/c1, r2/c2 and r3/c3. The packet is first transmitted at rate r0 for c0 attempts.

If the attempts fail, the packet is then transmitted using rate r1 for c1 attempts. The process is continued until the packet is successfully transmitted or discarded after c0+c1+c2+c3 un-successful transmission attempts.

The values for r0, r1, r2 and r3 in the retry chain may be selected in different ways which depends on type of transmission used. The Minstrel adaptation algorithm may use either normal transmission which occurs 90% of the time or sampling transmission which occurs for the remaining 10% of packets. Table 1 gives a summary of the rate selection decisions for this implementation of the algorithm. In normal transmission, the r values in the retry chain are selected in a way that r0 is the rate which achieves the highest expected throughput, r1 is the rate with the second highest expected throughput, r2 is the rate with the highest probability of success, and finally r3 is set to the lowest available data rate. In sampling transmission, the r values are selected in a way that r0 is set to the higher value either from the sample rate (which comprises a randomly selected rate to be tested during the sampling transmission) or the rate with the highest expected throughput, and r1 is set to the lower value among two. r2 is the rate with the highest probability of success and the r3 is the lowest available rate.

TABLE 1

Table 1 illustrates an example of a Minstrel Algorithm.

| | Sampling Transmission | | Normal |
|---|---|---|---|
| Rate | Random < Best | Random > Best | Transmission |
| r0 | Best rate | Random rate | Best rate |
| r1 | Random rate | Best rate | Second best rate |
| r2 | Best probability | Best probability | Best probability |
| r3 | Base rate | Base rate | Base rate |

The final step of the Minstrel algorithm may be to calculate the probability of success and expected throughput for each data rate. Minstrel maintains the probability of successful transmission at each data rate as an Exponentially Weighted Moving Average (EWMA). This probability is based on the historical success rate of packet transmissions at each data rate. This probability is used to estimate the throughput of each rate and the retry chain is re-evaluated based on this estimate every 100 ms. In each 100 ms sampling window, the success rate is calculated for each randomly selected data rate based on the historical observation of packet successes and failures. If a randomly selected data rate provides either a higher rate than the previous rates used during normal transmission, or a higher probability of success, the random rate may then be used during normal tranmission.

Link adaptation processes or algorithms for Wi-Fi, for example between an AP and a STA, do not currently consider that the transmitted packets may have different reliability requirements. As the link adaptation algorithm or process, for example, the Minstrel adaptation algorithm, adapts to varying channel conditions, the algorithms may lose packets when trying sampling new data rates, i.e. during sampling transmission, to increase bitrates (test new bitrates) as they operate with a trial and error approach without channel state/quality feedback. The Link Adaptation for WLAN may therefore currently be based purely on acknowledgment feedback after a successful reception.

US 2009/147678 discloses a method (see FIG. 6) in which ACK/NACK statistics are collected per traffic flow, compared to a predetermined threshold, and then used to update a data rate per traffic flow.

"*Efficient Rate Adaptation with QoS Support for Wireless Networks*" Khoder Shamy et al. ISBN:978-1-4244-2324-8 discloses a link adaptation algorithm in which the transmission rate is varied in dependence on QoS requirements.

SUMMARY

According to some embodiments there is provided a method in a transmitting node in a wireless local area network. The method comprises obtaining a first traffic flow for transmitting to a receiving node, wherein the first traffic flow is associated with a first category based on a reliability requirement associated with the first traffic flow; selecting a first link adaptation process from a plurality of link adaptation processes based on the first category; and transmitting the first traffic flow to the receiving node based on the first link adaptation process.

According to some embodiments there is provided a transmitting node in a wireless local area network. The transmitting node comprises processing circuitry configured to obtain a first traffic flow for transmitting to a receiving node, wherein the first traffic flow is associated with a first category based on a reliability requirement associated with the first traffic flow; select a first link adaptation process from a plurality of link adaptation processes based on the first category; and transmit the first traffic flow to the receiving node based on the first link adaptation process.

DESCRIPTION

Figure 1:
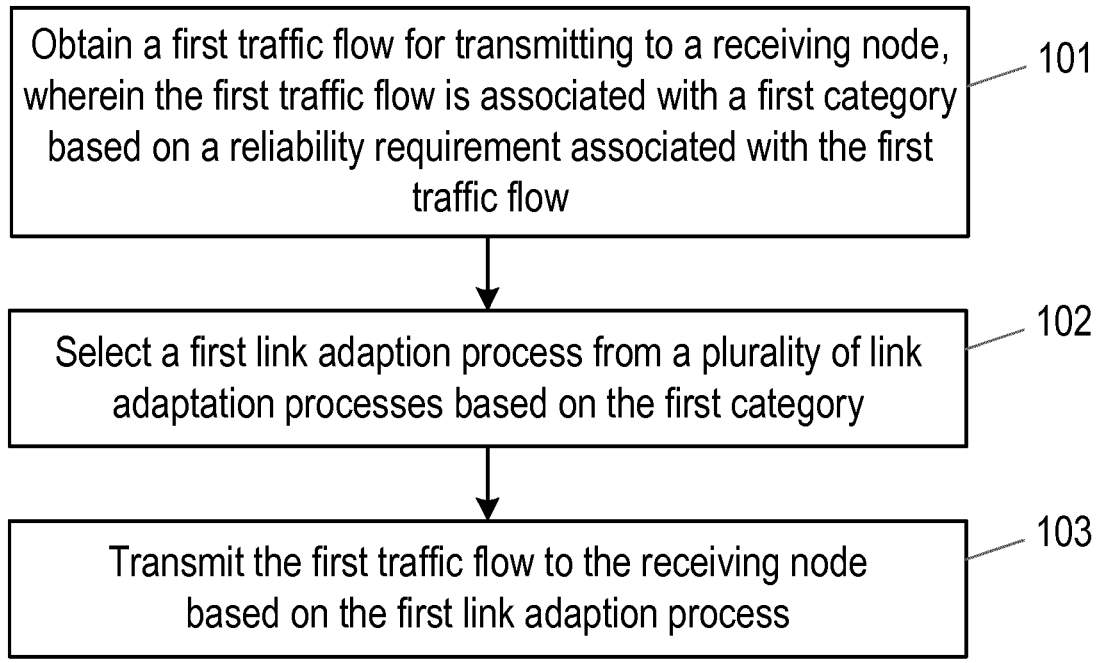
FIG. 1 illustrates a method in a transmitting node in a wireless local area network according to some embodiments.

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology may additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Embodiments described herein take into account the category of different traffic flows, where the category is based on a reliability requirement associated with each traffic flow, when determining a link adaptation process for a particular traffic flow.

For example, a TSN traffic flow may require higher reliability than a voice traffic flow and thus the link adaptation process may be selected based on this requirement. In addition, in case there are several concurrent flows in a communication link, embodiments described herein may perform a link adaptation process per traffic flow, and may test new modulation and coding schemes (MCSs) (or data rates) using a traffic flow with the lowest reliability requirements on the communication link in order to use well-tested MCSs (or data rates) (best probable) for the traffic flows having higher reliability requirements.

By utilizing knowledge of the reliability requirement associated with each traffic flow, the link adaptation process can be selected such that, for traffic flows requiring a higher level of reliability, the probability of losing packets due to sampling transmissions is reduced.

Furthermore, by utilizing knowledge gained in the link adaptation process for the lower reliability traffic flow to influence the link adaptation process for the higher reliability traffic flow, the data rates used in the higher reliability traffic flow may still benefit from the trial and error processing performed by the link adaption process for the lower reliability traffic flow.

FIG. 1 illustrates a method in a transmitting node in a wireless local area network. It will be appreciated that the transmitting node may comprise a mobile station (STA) or an access point (AP) in a communications link.

In step 101, the method comprises obtaining a first traffic flow for transmitting to a receiving node, wherein the first traffic flow is associated with a first category based on a reliability requirement associated with the first traffic flow. It will be appreciated that the receiving node may comprise a STA or an AP in a communications link.

For example, traffic flows for transmission to the receiving node may be categorized according to their reliability requirement. For example, reliability categories may be defined such as "low" and "high or use a higher granularity of possible categories may be used and the different traffic flows may be associated to each of these categories.

In some examples, a TSN traffic flow will have a reliability requirement based on the application generating and consuming the data. Therefore in some examples, any type of TSN traffic may have a higher reliability requirement than a voice flow, or video flow, or best effort flow, or background flow.

It will be appreciated that this categorization of the traffic flows may be performed by the transmitting device, or may be performed by another node in the network. In some example therefore, the first traffic flow may be received at the transmitting device along with some indication of the category associated with the first traffic flow.

In step 102, the method comprises selecting a first link adaptation process from a plurality of link adaptation processes based on the first category.

For example, there may be at least two link adaption processes. A first link adaptation process may be for traffic flows associated with a category for higher reliability requirements, whereas, a second link adaptation process may be for traffic flows associated with a category for lower reliability requirements. It will be appreciated that any number of link adaptation processes may be available, and that each link adaptation process may be associated with one or more categories.

In step 103, the method comprises transmitting the first traffic flow to the receiving node based on the first link adaptation process.

In some examples, therefore, the method may further comprise obtaining a second traffic flow for transmitting to the receiving node, wherein the second traffic flow is categorised into a second category based on a reliability requirement associated with the second traffic flow; selecting a second link adaptation process from the plurality of link adaptation processes based on the second category; and transmitting the second traffic flow to the receiving node based on the second link adaptation process.

For example, the first traffic flow may comprise a traffic flow having a high reliability requirement, for example a TSN traffic flow. The first category may therefore comprise a category associated with high reliability. The first link adaptation process may therefore comprise selecting a data rate for transmitting the first traffic flow by prioritising a probability of success for the data rate. In other words, as the traffic flows associated with the first category have high reliability requirements, the first link adaptation process may prioritise the probability of success for the transmission of packets rather than, for example, attempting to increase the expected throughput.

The second traffic flow may comprise a traffic flow having a low reliability requirement, for example a voice traffic flow. The second category may therefore comprise a category associated with low reliability. The second link adaptation process may therefore comprise selecting a data rate for transmitting the second traffic flow by prioritizing the expected throughput for the data rate. In other words, as reliability is less important for the traffic flows in the second category, the link adaptation process can prioritise finding data rates giving a high expected throughput.

Figure 2:
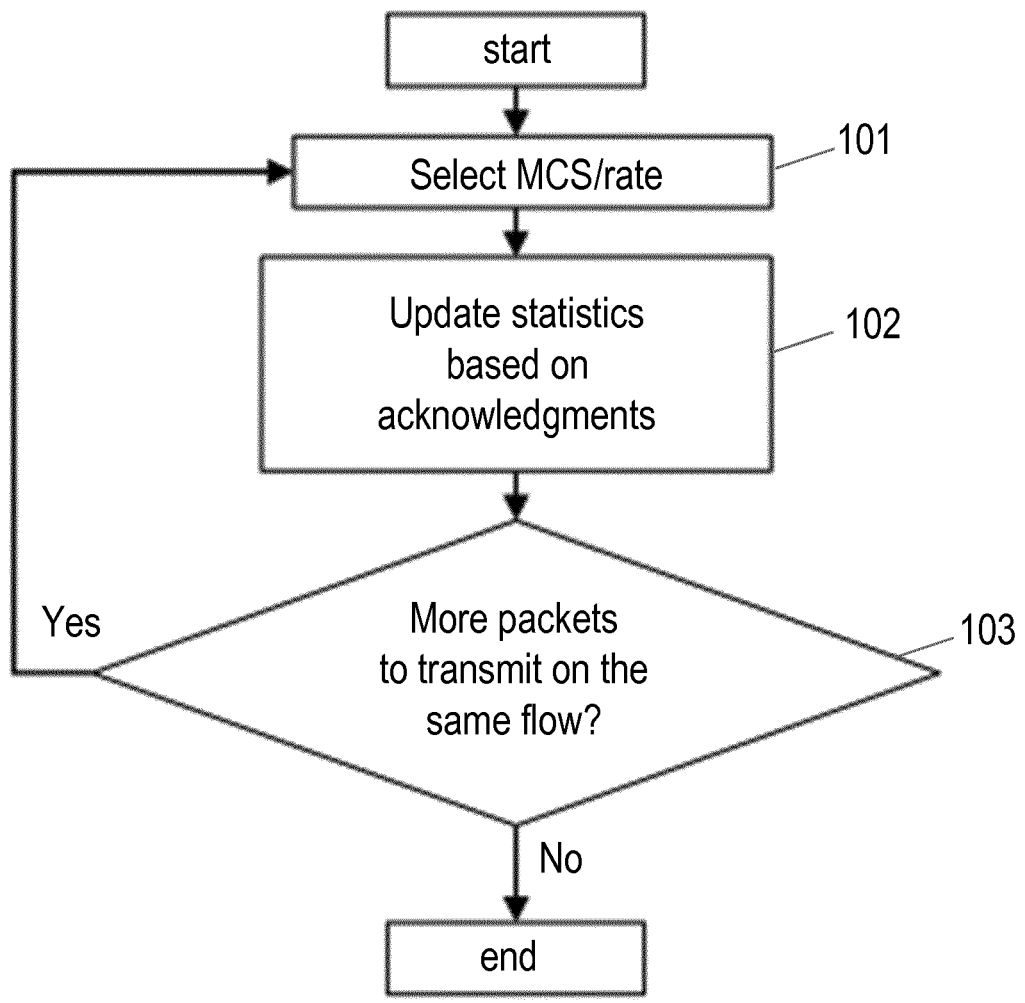
FIG. 2 illustrates an example of a method for performing the second link adaptation process for the second traffic flow according to some embodiments.

FIG. 2 illustrates an example of a method for performing the second link adaptation process for the second traffic flow. This method represents a method performed for traffic flows associated with a low reliability category.

In step 201 the second link adaptation process selects a data rate for transmission of a packet in the second traffic flow. For example, selecting a modulation and coding scheme effectively selects a data rate for transmission of the second traffic flow. The packet is transmitted.

The second link adaptation process may for example, operate, as described by the Minstrel algorithm above, by selecting the rate according to acknowledgment feedback from transmission of previous packets. It will be appreciated that any link adaptation process may be used here. For example, any link adaptation process that tests data rates during sampling transmission in order to collect statistics relating to the tested data rates.

In step 202, statistics relating to the best rate, best probability and the base rate are gathered based on acknowledgments for the transmitted packet in step 201. For example, step 202 may comprise updating information relating to one or more of a probability of success and an expected throughput associated with at least one sample data rate. The at least one sample data rate may comprise the data rates used by the second link adaptation process during transmission of the second traffic flow.

In step 203 the method comprises determining whether there are further packets to transmit on the second traffic flow. If further packets are to be transmitted, the method returns to step 201. If no further packets are to be transmitted, the method ends.

For the first link adaptation process different principles may be applied. For example the first link adaptation process may consider the reliability restriction and select the MCS/data rates to minimize packer error rate instead of maximizing bitrate.

The first link adaptation process will obtain information, statistics, gathered by the second link adaption process on the same radio link. Thus, it may uses the MCS/data rates with best probability of success as determined by the second link adaptation process to meet its packer error rate target.

When packet error rate is lower than the packet error rate target (packet success rate is higher than the packet success target), the link adaptation for higher reliability categories may test new MCS/data rates as dictated by the first link adaptation process.

Figure 3:
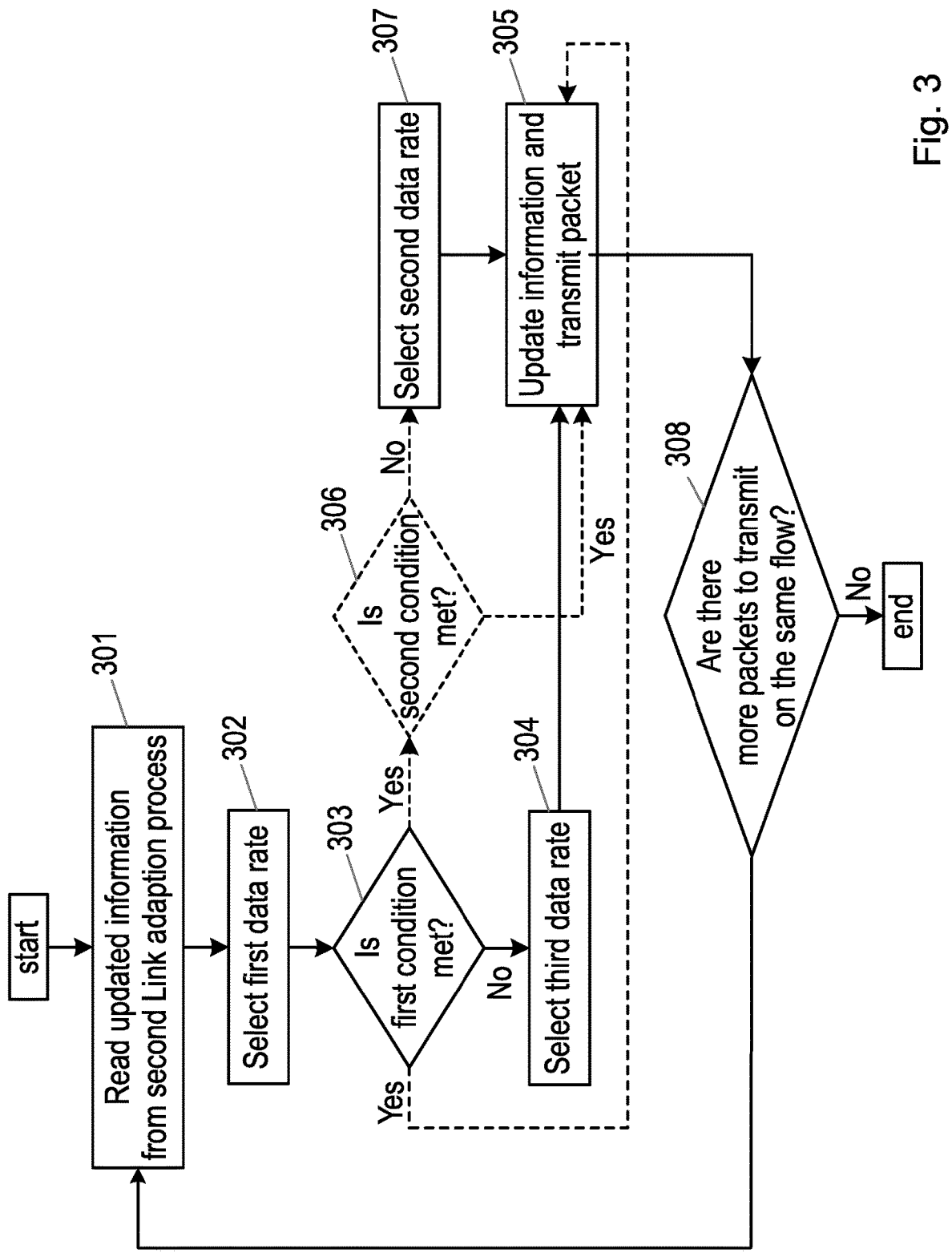
FIG. 3 illustrates an example of a method for performing the first link adaptation process according to some embodiments.

FIG. 3 illustrates an example of a method for performing the first link adaptation process according to some embodiments.

In step 301, the method comprises obtaining the updated information provided by the second link adaptation process in 202.

In step 302, the method comprises selecting a first data rate for the transmission of a packet from the at least one sample data rate based on the updated information from the second link adaptation process. This selection may also be made based on any updated information provided by the first link adaptation process in the transmission of previous packets. As previously, the selection of a data rate may be made by the selection of a MCS. It will be appreciated that, as the first link adaptation process may prioritise the probability of success associated with a data rate, the selection of the first data rate may be made to maximise the probability of success.

In step 303, the method comprises determining whether the probability of success associated with the first data rate meets a first condition. For example, the first condition may comprise a condition that the probability of success associated with the first data rate is above a first threshold.

If the first condition is not met, the method may pass to step 304 in which the method comprises selecting a third data rate associated with a higher probability of success than the first data rate. The method then passes to step 305 in which a packet of the traffic flow is transmitted using the third data rate. Step 305 may also comprise updating information relating to the probability of success and the expected throughput associated with the third data rate.

Returning to step 303, if the first condition is met, the method may in some embodiments pass to step 305 in which a packet of the traffic flow is transmitted using the first data rate. Step 305 may also comprise updating information relating to the probability of success and the expected throughput associated with the first data rate. In this embodiment there may be no second condition as described below with respect to step 306.

However, in some alternative embodiments, if the first condition is met, the method passes to step 306 in which the method comprises determining whether the probability of success associated with the first data rate meets a second condition. For example, the second condition may comprise a condition that the probability of success associated with the first data rate is below a second threshold wherein the second threshold is higher than the first threshold.

Responsive to the second condition being met, the method passes to step 305 in which the method comprises transmitting the packet of the first traffic flow using the first data rate. Step 305 may also comprise updating information relating to the probability of success and the expected throughput associated with the first data rate.

Responsive to the second condition not being met the method passes to step 307 in which the method comprises selecting a second data rate associated with a higher expected throughput than the first data rate. The method then passes to step 305 in which a packet of the traffic flow is transmitted using the second data rate. Step 305 may also comprise updating information relating to the probability of success and the expected throughput associated with the second data rate.

Following step 305, the method may pass to step 308 in which the method comprises determining whether there are further packets to transmit on the first traffic flow. If further packets are to be transmitted, the method returns to step 301. If no further packets are to be transmitted, the method may end.

In other words, the process of FIG. 3 described above allows the first link adaptation process to make use of information collected by the second link adaptation process, and of any information collected by the first link adaptation process in the transmission of previous packets, to select a first data rate. If this selection of the first data rate meets the first condition, or the first condition and the second condition, the first link adaptation process may transmit the packet without performing any sampling of new rates. However, should either or both of the first condition or second condition not be met, the first link adaptation process may sample new rates as dictated by, for example, the Minstrel link adaptation algorithm as described above.

The methods described in FIGS. 2 and 3 may for example, mean that the bit rates selected in the second link adaptation process may be optimized for highest throughput as the original Minstrel algorithm dictates, and the bit rates selected in the first link adaptation process may be optimized for minimizing packet error rate.

The methods described above may be applied to any link adaptation algorithm based on acknowledgment feedback such as the Minstrel algorithm for Wi-Fi, or other algorithms used in Wi-Fi systems. In contrast to link adaptation algorithms based on channel status/quality information which can track the channel changes more precisely, the proposed methods may for example, set a packet error rate target based on the reliability requirement for each link adaption process linked to a reliability requirement.

In some examples, the transmitting node may not receive a traffic flow for transmission in the second category. In these examples, the transmitting node may generate the second traffic flow by generating a dummy traffic flow comprising dummy packets.

This dummy traffic flow may comprise packets including a physical layer payload for which a data rate or modulation coding scheme can be set by a link adaptation process (for example as described above). We can call these packets, no-information MAC packets, or dummy packets, in contrast to Wi-Fi non-data packets (NDP) which don't have a physical layer payload and hence are not subject to link adaptation process rules. By having a TSN traffic flow and a no-information traffic flow, the method described with reference to FIG. 2 may be applied to the no-information traffic flow, and the method described with reference to FIG. 3 may be applied to the TSN traffic flow.

Figure 4:
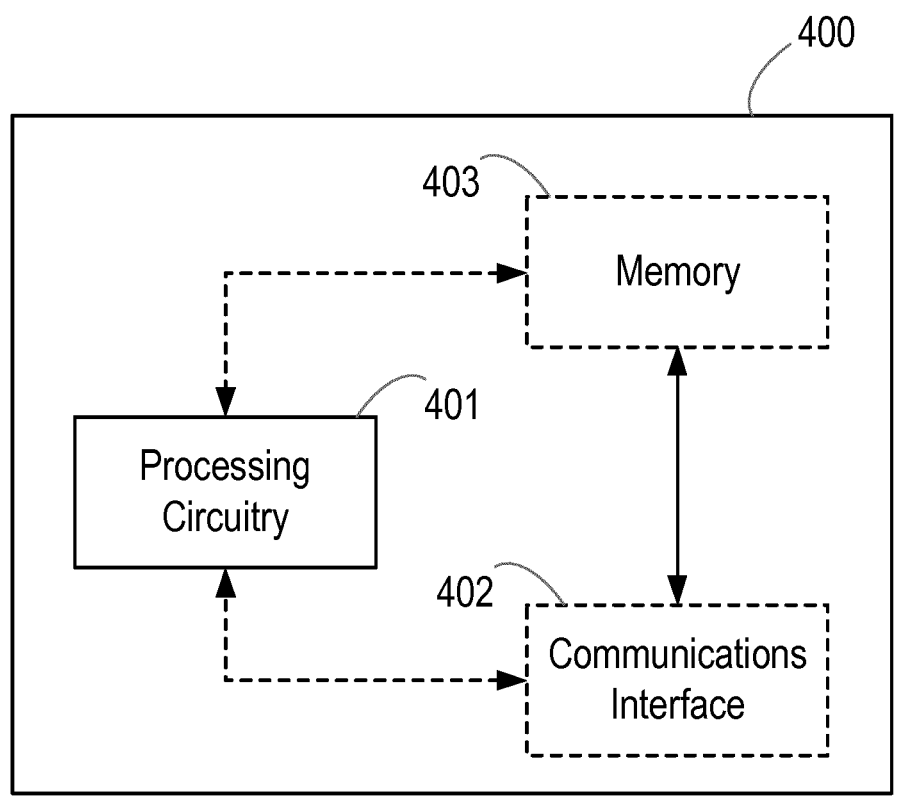
FIG. 4 illustrates a transmitting node comprising processing circuitry according to some embodiments.

FIG. 4 illustrates a transmitting node 400 comprising processing circuitry (or logic) 401. The processing circuitry 401 controls the operation of the transmitting node 400 and can implement the method described herein in relation to a transmitting node 400. The processing circuitry 401 can comprise one or more processors, processing units, multi-core processors or modules that are configured or programmed to control the transmitting node 400 in the manner described herein. In particular implementations, the processing circuitry 401 may comprise a plurality of software and/or hardware modules that are each configured to perform, or are for performing, individual or multiple steps of the method described herein in relation to the transmitting node 400.

Briefly, the processing circuitry 401 of the transmitting node 400 is configured to obtain a first traffic flow for transmitting to a receiving node, wherein the first traffic flow is associated with a first category based on a reliability requirement associated with the first traffic flow; select a first link adaptation process from a plurality of link adaptation processes based on the first category; and transmit the first traffic flow to the receiving node based on the first link adaptation process.

In some embodiments, the transmitting node 400 may optionally comprise a communications interface 402. The communications interface 402 of the transmitting node 400 can be for use in communicating with other nodes, such as other virtual nodes. For example, the communications interface 402 of the transmitting node 400 may be configured to transmit to and/or receive from other nodes requests, resources, information, data, signals, or similar. The processing circuitry 401 of the transmitting node 400 may be configured to control the communications interface 402 of the transmitting node 400 to transmit to and/or receive from other nodes requests, resources, information, data, signals, or similar.

Optionally, the transmitting node 400 may comprise a memory 403. In some embodiments, the memory 403 of the transmitting node 400 can be configured to store program code that can be executed by the processing circuitry 401 of the transmitting node 400 to perform the method described herein in relation to the transmitting node 400. Alternatively, or in addition, the memory 403 of the transmitting node 400, can be configured to store any requests, resources, information, data, signals, or similar that are described herein. The processing circuitry 401 of the transmitting node 400 may be configured to control the memory 403 of the transmitting node 400 to store any requests, resources, information, data, signals, or similar that are described herein.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method in a transmitting node in a wireless local area network, the method comprising:
    obtaining first and second traffic flows for transmitting to a receiving node, wherein the first traffic flow is categorized into a first category based on a reliability requirement associated with the first traffic flow, wherein the second traffic flow is categorized into a second category based on a reliability requirement associated with the second traffic flow; wherein the first and second categories are different;
    selecting a first link adaptation process from a plurality of link adaptation processes for the first category, and a second link adaptation process from the plurality of link adaptation processes for the second category, wherein the first and second link adaptation processes are different and the second category is associated with lower reliability requirement than the first category;
    transmitting the first traffic flow to the receiving node based on the first link adaptation process; and
    transmitting the second traffic flow to the receiving node based on the second link adaptation process;
    wherein the second link adaptation process comprises updating information relating to a probability of successful transmission and/or an expected throughput associated with at least one sample data rate tested for the second traffic flow; and
    wherein the first link adaptation process comprises selecting a first data rate for the first traffic flow from the at least one sample data rate tested for the second traffic flow based on the updated information from the second link adaptation process.

2. The method of claim 1, wherein the second link adaptation process comprises selecting a data rate for transmitting the second traffic flow by prioritizing the expected throughput for the data rate.

3. The method of claim 1, wherein the first link adaptation process comprises selecting a data rate for transmitting the first traffic flow by prioritizing a probability of successful transmission for the data rate.

4. The method of claim 1:
    further comprising transmitting, responsive to a probability of success associated with the first data rate meeting a first condition, a packet of the first traffic flow using the first data rate;
    wherein the first condition comprises a condition that the probability of successful transmission associated with the first data rate is above a first threshold.

5. The method of claim 4:
    further comprising performing the transmitting the packet of the first traffic flow using the first data rate responsive to the probability of successful transmission associated with the first data rate meeting a second condition;
    wherein the second condition comprises a condition that the probability of successful transmission associated with the first data rate is below a second threshold; and
    wherein the second threshold is higher than the first threshold.

6. The method of claim 5, further comprising:
    selecting, responsive to the probability of successful transmission associated with the first data rate not meeting the second condition, a second data rate associated with a higher expected throughput than the first data rate; and
    transmitting the packet of the first traffic flow with the second data rate.

7. The method of claim 4, further comprising:
    selecting, responsive to the probability of successful transmission associated with the first data rate not meeting the first condition, a third data rate associated with a higher probability of successful transmission than the first data rate; and
    transmitting the packet of the first traffic flow with the third data rate.

8. The method as of claim 1, wherein the obtaining comprises generating the second traffic flow, responsive to the transmitting node not receiving a traffic flow for transmission in the second category, by generating a dummy traffic flow comprising dummy packets.

9. The method of claim 1, wherein the first link adaptation process comprises:
    updating information relating to a probability of successful transmission and/or an expected throughput associated with at least one sample data rate; and
    selecting a first data rate from the at least one sample data rate based on the updated information from the first link adaptation process.

10. A transmitting node in a wireless local area network, the transmitting node comprising:
    processing circuitry;
    memory containing instructions executable by the processing circuitry whereby the transmitting node is operative to:
        obtain first and second traffic flows for transmitting to a receiving node, wherein the first traffic flow is associated with a first category based on a reliability requirement associated with the first traffic flow, wherein the second traffic flow is categorized into a second category based on a reliability requirement associated with the second traffic flow; wherein the first and second categories are different;
        select a first link adaptation process from a plurality of link adaptation processes for the first category, and a second link adaptation process from the plurality of link adaptation processes for the second category, wherein the first and second link adaptation processes are different and the second category is associated with lower reliability requirement than the first category;

transmit the first traffic flow to the receiving node based on the first link adaptation process;

transmit the second traffic flow to the receiving node based on the second link adaptation process; and wherein the second link adaptation process comprises updating information relating to a probability of successful transmission and/or an expected throughput associated with at least one sample data rate tested for the second traffic flow; and wherein the first link adaptation process comprises selecting a first data rate for the first traffic flow from the at least one sample data rate tested for the second traffic flow based on the updated information from the second link adaptation process.

11. The transmitting node of claim 10, wherein the instructions are such that the transmitting node is operative to perform the second link adaptation process by selecting a data rate for transmitting the second traffic flow by prioritizing the expected throughput for the data rate.

12. The transmitting of claim 11, wherein the instructions are such that the transmitting node is operative to perform the first link adaptation process by selecting a data rate for transmitting the first traffic flow by prioritizing a probability of successful transmission for the data rate.

13. The transmitting node of claim 10:

wherein the instructions are such that the transmitting node is operative to transmit, responsive to a probability of successful transmission associated with the first data rate meeting a first condition, a packet of the first traffic flow using the first data rate;

wherein the first condition comprises a condition that the probability of successful transmission associated with the first data rate is above a first threshold.

14. The transmitting node of claim 13:

wherein the instructions are such that the transmitting node is operative to perform the transmitting the packet of first traffic flow using the first data rate responsive to the probability of successful transmission associated with the first data rate meeting a second condition;

wherein the second condition comprises a condition that the probability of successful transmission associated with the first data rate is below a second threshold; and wherein the second threshold is higher than the first threshold.

15. The transmitting node of claim 14, wherein the instructions are such that the transmitting node is operative to:

select, responsive to the probability of successful transmission associated with the first data rate not meeting the second condition, a second data rate associated with a higher expected throughput than the first data rate; and transmit the packet of the first traffic flow with the second data rate.

16. The transmitting node of claim 13, wherein the instructions are such that the transmitting node is operative to:

select, responsive to the probability of successful transmission associated with the first data rate not meeting the first condition, a third data rate associated with a higher probability of successful transmission than the first data rate; and transmit the packet of the first traffic flow with the third data rate.

17. The transmitting node of claim 10, wherein the instructions are such that the transmitting node is operative to perform the obtaining by generating the second traffic flow, responsive to the transmitting node not receiving a traffic flow for transmission in the second category, by generating a dummy traffic flow comprising dummy packets.

18. The transmitting node of claim 10, wherein the instructions are such that the transmitting node is operative to perform the first link adaptation process by:

updating information relating to a probability of successful transmission and/or an expected throughput associated with at least one sample data rate; and selecting a first data rate from the at least one sample data rate based on the updated information from the first link adaptation process.

* * * * *